Roman F. Arnoldy
INVENTOR.

May 19, 1970 R. F. ARNOLDY 3,513,288
ANNULAR ARC BULK WELDING APPARATUS AND METHOD
Filed April 8, 1969 2 Sheets-Sheet 2

Roman F. Arnoldy
INVENTOR.
BY James H. Weiler
Jefferson D. Giller
Dudley R. Dobie, Jr.
ATTORNEYS

United States Patent Office 3,513,288
Patented May 19, 1970

3,513,288
ANNULAR ARC BULK WELDING APPARATUS
AND METHOD
Roman F. Arnoldy, Houston, Tex., assignor to R. I. Patents, Inc., Houston, Tex., a corporation of Texas
Continuation-in-part of application Ser. No. 528,126, Feb. 17, 1966. This application Apr. 8, 1969, Ser. No. 814,354
Int. Cl. B23k 9/00
U.S. Cl. 219—137  8 Claims

ABSTRACT OF THE DISCLOSURE

A method of bulk welding utilizing a hollow consumable electrode formed on a welding device and passing granular alloy material through the hollow electrode for deposition on the surface to be welded while maintaining an arc from the electrode. A welding apparatus including a welding head suspended over a surface to be welded, hollow electrode forming means and material carried by the welding head, means to feed the hollow electrode toward the surface to be welded, and means for passing granular alloy material through the hollow electrode onto the surface to be welded during welding operations.

CROSS-REFERENCES TO RELATED APPLICATIONS

This is a continuation-in-part of application Ser. No. 528,126 filed Feb. 17, 1966 for an invention in "Annular Arc Welding," which application No. 528,126 is being abandoned contemporaneously with the filing of the present patent application.

BACKGROUND OF THE INVENTION

The field of art to which the invention pertains is electric arc welding and more particularly to electric arc welding in which the weld bead head is composed of metal from a consumable electrode and alloy granules. In the present invention, the alloy granules are supplied by passing them through a thin-walled tubular electrode formed on the welding head. This is a type of bulk welding and as used herein the term "bulk welding" means electric arc welding using a consumable electrode and a layer of granular alloy material delivered to the weld zone, the ratio of the weight of granular alloy material to the weight of the consumed electrode in the weld zone is between about 0.5 and 3.0. "Welding" as used herein includes securing pieces of base metal together, cladding and the like. "Granular material" as used herein includes powdered material.

Pat. No. 2,191,469 entitled "Veneering of Metallic Surfaces" and Pat. No. 2,191,471 entitled "Welding Method," both issued Feb. 27, 1940 upon the application of R. K. Hopkins, illustrate welding utilizing a hollow electrode through which granular material is passed to the metal surface being welded but in a different apparatus and method than those of the present application.

British patent specification No. 441,834 filed Apr. 21, 1934 and entitled "Improvements in and Relating to Electric Arc Welding" shows the formation of a tubular electrode on a welding head but also in a different apparatus and method than those of the present application.

SUMMARY OF THE INVENTION

It is conventional in certain types of electric arc welding to have the final weld bead composed of an alloy of iron or steel. For various reasons, it is often not practical to attempt to have this alloy in the form of a consumable electrode, especially for use with automatic or semi-automatic welding apparatus where the electrode is generally coiled in lengths of as much as 100 feet or more. If the consumable electrode is made as a tube having a steel wall filled wtih alloying material, the wall thickness of such tube is usually so great that the proportion of alloying material to tube wall metal is so small that the use of such tubes is necessarily limited to analysis where the percentage of alloy forming elements of the final weld bead is relatively low.

Bulk welding is a way to supply material of proper analysis for the desired weld bead in instances where the ratio of the weight of the granular alloy material to the weight of consumed electrode in the weld zone is between about 0.5 and 3.0. In bulk welding, the arc from the consumable electrode is directed against a layer of loose granular material with the heat of the arc melting both the granular material and the electrode and forming a puddle of these molten metals which blend together. However, the layer of alloy materials is not always evenly spaced over the entire weld area because the layer is often triangular in cross section and the layer sometimes becomes unduly dispersed by the physical force of the electric arc and as a result the final analysis of the weld bead is not uniform.

It is a general object of the present invention to provide an apparatus and a method for bulk welding in which the granules of alloy material are not dispersed by the physical force of the arc.

Another object of the present invention is to provide a method and apparatus for bulk welding in which the alloy granules are passed through a hollow consumable electrode and deposited in the weld zone of a metal surface being welded while an annular arc is being maintained from the wall of the consumable electrode at its lower end.

Another object of the present invention is to provide such a method and apparatus for bulk welding in which a hollow electrode having a wall thickness no greater than approximately .015 inch is formed on the welding head and the alloy granules are placed in the electrode as it is being formed and are passed to the weld zone.

A still further object of the present invention is to provide such a method and apparatus which has provision for flexing, shielding and/or submerging the arc.

The method of this invention generally comprises continuously forming metal strip material of approximately .015 inch or less in thickness into a hollow electrode as the welding progresses, the tubular electrode being of such cross-sectional area that granular alloy material will pass through the electrode, inserting metered quantities of granular alloy material into and through the hollow electrode as it is being formed, and maintaining an annular arc from the lower end of the electrode.

By the use of a metal strip having a wall thickness no greater than approximately .015 inch, the metal strip is sufficiently light that it can be conveniently formed into a tubular electrode on the welding head, will not require excessive amounts of current, and will not provide too much metal from the electrode in relation to the weight of the granular alloy material in the welding zone. By allowing the granular alloy material to fall through the tubular electrode, the granular alloy material will be melted principally by the heat from the bottom end of the arc and the molten puddle on the surface being welded. The heat of the plasma of the arc also contributes to this melting. This results in a melting power per ampere of current of about four times that which would exist if the alloy material were held in the tube for in that instance such material would be melted only by the heat of the upper end of the arc. Additionally, in reverse polarity, that is where the surface being welded has a negative polarity and the electrode has a positive polarity as is commonly used in bulk welding, the heat at the lower end of the arc is about 1.6 times the heat at the upper end of the arc.

Since the granular alloy material of the present invention falls through the electrode, it is not electrically connected to the electrode and therefore the arc will be only from the wall of the lower end of the electrode resulting in the formation of a generally annular arc surrounding the alloy granules as they are deposited in the molten puddle on the surface being welded and preventing the granules from being dispersed. Additionally, by having this arc in an annular shape, it will be much less concentrated and have much less physical force directed toward penetration of the puddle than if the same amount of current was passed from an electrode of the same weight per unit of length which was so small in diameter that granular alloys could not be passed through it.

DESCRIPTION OF THE PREFERRED EMBODIMENTS

Figure 1:
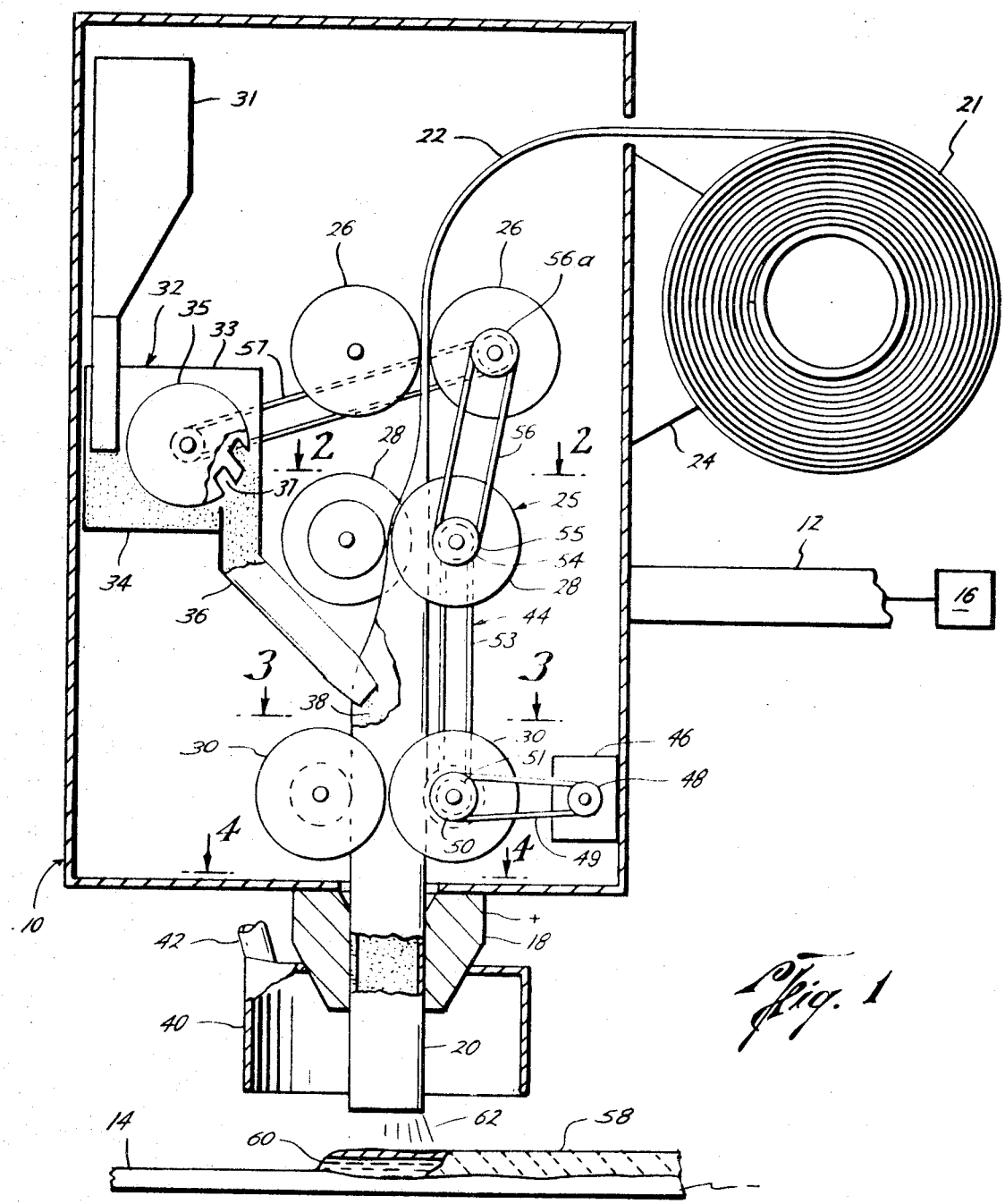
FIG. 1 is a partial sectional side view of an apparatus suitable for use with the invention.
Figure 2:
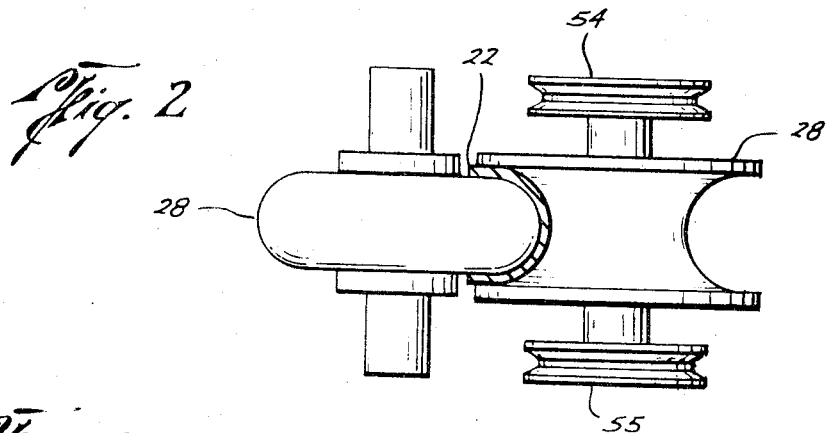
FIG. 2 is a view taken along the line 2—2 of FIG. 1.
Figure 3:
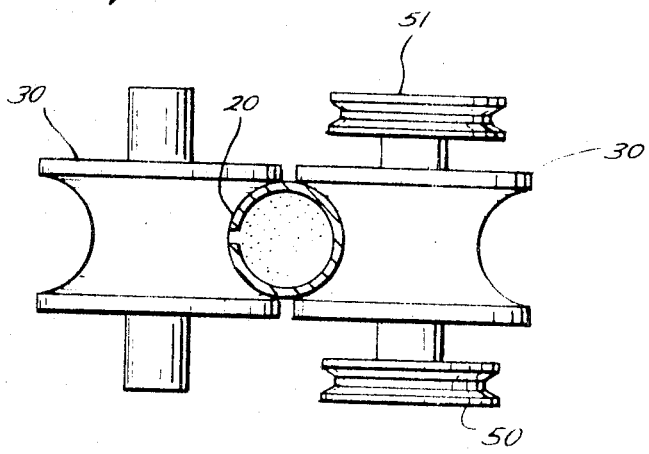
FIG. 3 is a view taken along the line 3—3 of FIG. 1.

Referring now to the drawings, the reference numeral 10 generally designates the welding head which is supported, such as by the boom 12, above the metal surface 14 which is to be welded. Attached to the boom 12 is an appropriate means 16 for moving the welding head 10 relative to the surface 14, either in a straight line pattern, zigzag pattern, and with or without oscillation as desired.

Extending downwardly from the welding head 10 is an electrode nozzle 18 through which a tubular electrode 20 is pushed, and which serves as a means for establishing electrical contact with the electrode 20. Also mounted on the welding head 10 is a supply, in the form of a coil 21, of strip material 22 which coil is rotatably supported by the coil support 24. The strip material 22 is fed from the coil 21 through a pair of guide rollers 26 to a forming means 25 which includes a pair of initial forming rollers 28 and a pair of closing rollers 30 so that the tubular electrode 20 is formed from the strip material 22.

Mounted within the welding head 10 is a granular alloy feeding means 32 which may generally include a metering means 34 and a granular insertion means 36 whereby granular alloy material 38 is metered and fed into the tubular electrode 20 between the initial forming rollers 28 and the closing rollers 30. The granular material 38 falls through the electrode 20 to the surface 14 to be welded.

Preferably the granular alloy feeding means 32 includes a hopper 31 into which the granular material 38 is placed. The hopper 31 feeds into a bin 33 in which rotates a feed or metering wheel 35 having a plurality of recesses or pockets 37 which pick up the granular material from the bin 33 at a measured rate and deposit it into the granular insertion means 36. Similar apparatus is disclosed in my patents, Nos. 3,060,307 and 3,172,991 to which reference is made.

Appropriately attached to the welding head 10 at the nozzle 18 and surrounding the electrode 20 is an optional shield 40 which may be utilized to provide a gas shield to the electrode 20 by means of an appropriate gas inlet 42 leading thereto. Similarly, the shield 40 may be used for surrounding the electrode 20 with flux or to provide a submerged arc, if desirable. A further explanation of gas shielding may be found in such U.S. patents as No. 3,102,025 and No. 2,725,125. Additionally, flux may be metered and supplied with the granular materials if desired.

Interconnecting the forming rollers 28 and the closing rollers 30 is a drive means or mechanism 44. It also interconnects with the metering means 34. This drive means 44 is utilized to pull the metal strip 22 from the coil 21, move the strip 22 through the rollers 28 and 30 to form the electrode 20 and pass it downwardly through the nozzle 18 at the desired speed while coordinating the rate of feed of granular alloy material 38 into the electrode 20 by controlling the rotation of the feed wheel 35. This drive mechanism 44 includes a motor 46 driving a pulley 48 to move a belt 49 which is mounted on a pulley 50 on one of the closing rollers 30 to rotate that closing roller. That closing roller also has a pulley 51 on which is a belt 53 which passes over a pulley 54 on one of the forming rollers 28 to impart rotation to it. On that same forming roller 28 is another pulley 55 on which is a belt 56 which connects to a pulley 56a on one of the guide rollers 26. A belt 57 is connected between pulleys, not shown, on this guide roller 26 and the feed wheel 35.

Figure 4:
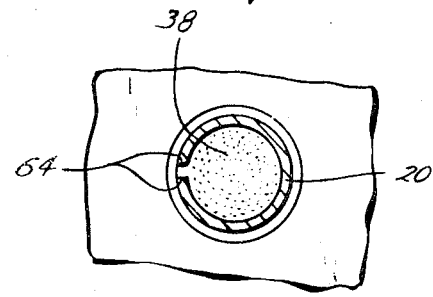
FIG. 4 is a view taken along the line 4—4 of FIG. 1.

Referring now to FIG. 4, the tubular electrode 20 is shown as cylindrical, and, of course, may be elliptical, oval or any other elongated hollow shape as may be desired. Also, as disclosed in FIG. 4, the electrode 20 need not be completely closed. Shown within the electrode 20 is the granular alloy material 38 which is falling to the surface 14 (see FIG. 1) to which it will become attached and form a bead 58. As best seen in FIG. 1, the granular alloy material 38 falls into a molten puddle 60 formed by the arc 62 at the rim of the lower end of the electrode 20 and this is deposited in the puddle 60 within the confines of the arc 62.

Preferably the tubular electrode 20 is about 1 inch in diameter and has a wall thickness of .005 inch. The diameter of the tubular electrode 20 may be as small as approximately 3/8 of an inch as this is the approximate lower limit at which the proper ratio of metal from the electrode to the weight of the granular alloy material can be obtained and which will permit the free passage of granular alloy material down through the electrode 20. In all events, the electrode 20 must be of sufficient cross-sectional area to permit the granular alloy material 38 to pass through it to the metal surface 14.

The nozzle 18 is shown at a positive potential and the surface 14 as negative, being supplied by conventional equipment of approximately 500 amp capacity. Both positive and reverse polarity direct current, as well as AC, may be utilized with the present invention.

As the granular alloy material 38 falls into the puddle 60 on the metal surface 14, the granular alloy material 38 takes the polarity of the surface 14. No arc passes from the granular alloy material 38 while it is in the electrode 20 because the granular alloy material 38 is not sufficiently electrically connected to the electrode 20 while it is falling to maintain an arc.

The heat of the upper end of the arc 62 melts the electrode 20 but the granular material 38 flowing through the electrode 20 and deposited in the puddle 60 on the surface 14 is melted principally by the lower end of the arc 62 and by the heat of the puddle 60 together with heat from the plasma of the arc 62. Because of the use of the upper end of the arc to melt the consumable electrode 20 and the lower end of arc and the heat of the puddle to melt the granular material 38, there results a much greater rate of deposition of weld bead 58 with the process of the present invention than when the alloy material is retained in an electrode and is melted by the upper end of the arc only.

In use, the welding head 10 is positioned over the metal surface 14. The means 16 is actuated to move the welding head 10 relative to the metal surface 14 and at the same time the drive mechanism 44 is engaged so that the strip material 22 is fed through the tube forming means 25 to form the tubular electrode 20 which is pushed toward the surface 14 through the electrode nozzle 18. When the proper distance is reached, an arc is struck between the electrode 20 and the surface 14, which, of course, melts off the lowermost portion of electrode 20. At the same time, granular alloy material 38 is placed in hopper 31 in order to meter and insert granular alloy material 38 into the electrode 20 whereupon this material 38 will fall upon the molten puddle 60 on the surface 14. The lower end of the annular arc and the heat of the puddle will melt this granular material thus forming the bead 58 as the welding head 10 is moved.

An example of the use of the method and apparatus of the present invention is to do a hard-facing type of cladding to produce a high chromium iron hard-facing on the surface 14. The alloy material 38 is a powder having (i) 90% high carbon ferrochromium, consisting of 65% chromium, 9% carbon and the balance iron and (ii) 10% ferromanganese consisting of 75% manganese, 7½% carbon and the balance iron. The strip material 22 is .005 inch thick and made of mild steel having approximately .10% carbon with the balance being principally iron. This strip 22 is formed into an electrode 20 having an approximate 1 inch diameter. A 450 ampere current is used to melt the electrode 20 at the rate of .2 pound of electrode per minute. The ratio of alloy material 38 melted to weight of electrode 20 melted is 1.5 so the alloy material 38 would be fed at the rate of .3 pound per minute. The travel rate of the welding head 10 is adjusted to produce a high chromium iron hard-facing of approximately $5/32$ of an inch in thickness.

While the present invention may be used with an open arc because the granular alloy material 38 is surrounded by an arc from the tubular electrode 20 which restricts the material 38 from being blown away, it may at times be advantageous to shield, flux or submerge the arc between the electrode 20 and the surface 14. This may be accomplished by the shield 40 or by feeding appropriate materials into the tubular electrode 20 as it is formed.

The present invention, therefore, is well adapted to carry out the objects and attain the ends and advantages mentioned as well as others inherent therein. While the presently preferred embodiment of the invention has been given for the purpose of disclosure, numerous changes in details of construction and uses may be resorted to without departing from the spirit and scope of the invention as defined in the following claims.

What is claimed is:

1. In a welding head which has relative parallel movement to a metal surface to be welded, the improvement comprising a welding head which includes:
    (a) an electrode nozzle,
    (b) a supply of a strip no thicker than about .015 inch of electrode material,
    (c) tube forming means arranged to shape the strip into a tubular electrode at least about ⅜ inch in diameter and of sufficient cross-sectional area that granular alloy material will pass through the tubular electrode,
    (d) drive means arranged to pass the strip through the tube forming means where it is converted into a tubular electrode and pass the tubular electrode through the electrode nozzle, and
    (e) granular alloy material feeding means including means to meter and pass granular alloy material through the tubular electrode whereby as the tubular electrode is formed the granular alloy material is fed therethrough to the metal surface.

2. The combination of claim 1 wherein the tube forming means includes initial forming rollers and closing rollers and where the granular alloy feeding means introduces the granular alloy into the tubular electrode between the initial and closing rollers.

3. The combination of claim 1 including:
    (f) a shield surrounding the lower end of the tubular electrode and extending therefrom, and
    (g) inlet means attached to the shield whereby fluxing, shielding and submerging materials may be placed about said electrode.

4. The combination of claim 1 in which the strip is approximately .005 inch thick and the tubular electrode is approximately 1 inch in diameter.

5. In a method of bulk welding a metal surface, the improvement including the steps of:
    (a) moving a strip of electrode material no thicker than about .015 inch from a supply thereof,
    (b) forming the strip into a tubular electrode at least approximately ⅜ of an inch in diameter,
    (c) feeding the tubular electrode through an electrode nozzle carried by a welding head to the metal surface to be welded,
    (d) maintaining an arc between the metal surface and the lower end of the tubular electrode,
    (e) metering a quantity of granular alloy material,
    (f) inserting the metered granular alloy material into the tubular electrode as it is being formed, and
    (g) passing the granular alloy through the tubular electrode to the metal surface within the arc.

6. The method of claim 5 including the step of moving the tubular electrode in a parallel direction relative to the metal surface.

7. The method of claim 5 including the step of shielding the arc maintained between the metal surface and the tubular electrode.

8. The method of claim 5 in which the tubular electrode is approximately 1 inch in diameter and the strip is approximately .005 inch thick.

References Cited

UNITED STATES PATENTS

| | | | |
|---|---|---|---|
| 1,629,748 | 5/1927 | Stoody | 219—146 |
| 2,083,309 | 6/1937 | Applegate | 219—76 X |
| 2,151,914 | 3/1939 | Hopkins | 219—76 X |
| 2,965,524 | 12/1960 | Claussen et al. | 219—146 X |
| 3,184,578 | 5/1965 | Albers et al. | 219—146 |

JOSEPH V. TRUHE, Primary Examiner

C. L. ALBRITTON, Assistant Examiner

U.S. Cl. X.R.

219—76, 130